United States Patent
Pasternak et al.

(10) Patent No.: US 8,770,746 B2
(45) Date of Patent: Jul. 8, 2014

(54) METHODS MATERIALS AND SYSTEMS FOR PRODUCING A CONTACT LENS AND CONTACT LENSES PRODUCED USING SAID METHODS MATERIALS AND SYSTEMS

(76) Inventors: Jonathan Baruch Pasternak, Herzeliya (IL); Vladimir Sherman, Herzeliya (IL)

( * ) Notice: Subject to any disclaimer, the term of this patent is extended or adjusted under 35 U.S.C. 154(b) by 137 days.

(21) Appl. No.: 13/384,356

(22) PCT Filed: Jul. 18, 2010

(86) PCT No.: PCT/IB2010/053264
§ 371 (c)(1),
(2), (4) Date: Jan. 17, 2012

(87) PCT Pub. No.: WO2011/010267
PCT Pub. Date: Jan. 27, 2011

(65) Prior Publication Data
US 2012/0113384 A1     May 10, 2012

Related U.S. Application Data

(60) Provisional application No. 61/226,700, filed on Jul. 18, 2009.

(51) Int. Cl.
*G02C 7/04* (2006.01)
*G02C 7/02* (2006.01)

(52) U.S. Cl.
CPC ............. *G02C 7/021* (2013.01); *G02C 7/049* (2013.01)
USPC ............. 351/159.28; 351/159.24; 351/159.8

(58) Field of Classification Search
CPC ......... G02C 7/049; G02C 7/021; G02C 7/022
USPC .............. 351/159.25, 159.28, 159.3, 159.32, 351/159.8
See application file for complete search history.

(56) References Cited

U.S. PATENT DOCUMENTS

| | | | |
|---|---|---|---|
| 5,631,720 A | 5/1997 | Guglielmetti et al. | |
| 8,388,132 B2 * | 3/2013 | Enerson | 351/159.28 |
| 2005/0221276 A1 | 10/2005 | Rozakis et al. | |
| 2006/0054525 A1 | 3/2006 | Dean et al. | |
| 2011/0249234 A1 * | 10/2011 | Duis et al. | 351/160 R |
| 2013/0088683 A1 * | 4/2013 | Heacock et al. | 351/159.28 |

FOREIGN PATENT DOCUMENTS

JP      63-038914    * 2/1988
(Continued)

OTHER PUBLICATIONS

Chinese Patent Application No. 201080041668.0 Search Report dated Mar. 28, 2013 with English translation thereof (4 pages).
Chinese Patent Application No. 201080041668.0 Official Communication dated Apr. 8, 2013 with English translation thereof (12 pages).

(Continued)

*Primary Examiner* — Jordan Schwartz
(74) *Attorney, Agent, or Firm* — Vladimir Sherman; Professional Patent Solutions

(57) ABSTRACT

Disclosed are methods, materials and systems for producing contact lenses and contact lenses produced using said methods, materials and systems. According to some embodiments, a contact lens produced by said methods, materials and systems includes an extra-ocular indicator ("EOI") adapted to alter in color upon removal of said lens from an eye. The EOI may be at least partially composed of a pigment adapted to become relatively more visible when the contact lens is outside an eye than when the contact lens is placed in an eye.

15 Claims, 14 Drawing Sheets

Lens With Indicator Becomes Visible Due to Color Change From Substantially Clear to a Visible Color (e.g. Red, Blue, Green, etc.)

(56) References Cited

FOREIGN PATENT DOCUMENTS

| JP | 63-163321 | * | 7/1988 |
|---|---|---|---|
| JP | 1200325 A | | 8/1989 |
| JP | 02-187718 | | 7/1990 |
| JP | 03-154025 | | 7/1991 |
| JP | 05-075730 | | 10/1993 |
| KR | 20090021445 A | | 3/2008 |

OTHER PUBLICATIONS

Chinese Patent Application No. 201080041668.0 Response to Official Communication dated Apr. 8, 2013, submitted Nov. 7, 2013 with English translation of claim amendments submitted (11 pages).

European Patent Application No. EP 10802018.1, Supplemental European Search Report mailed Nov. 14, 2013 (5 pages).

Japanese Patent Application No. 2012-521138—Official Communication dated Mar. 25, 2014 with English translation thereof (8 pages).

* cited by examiner

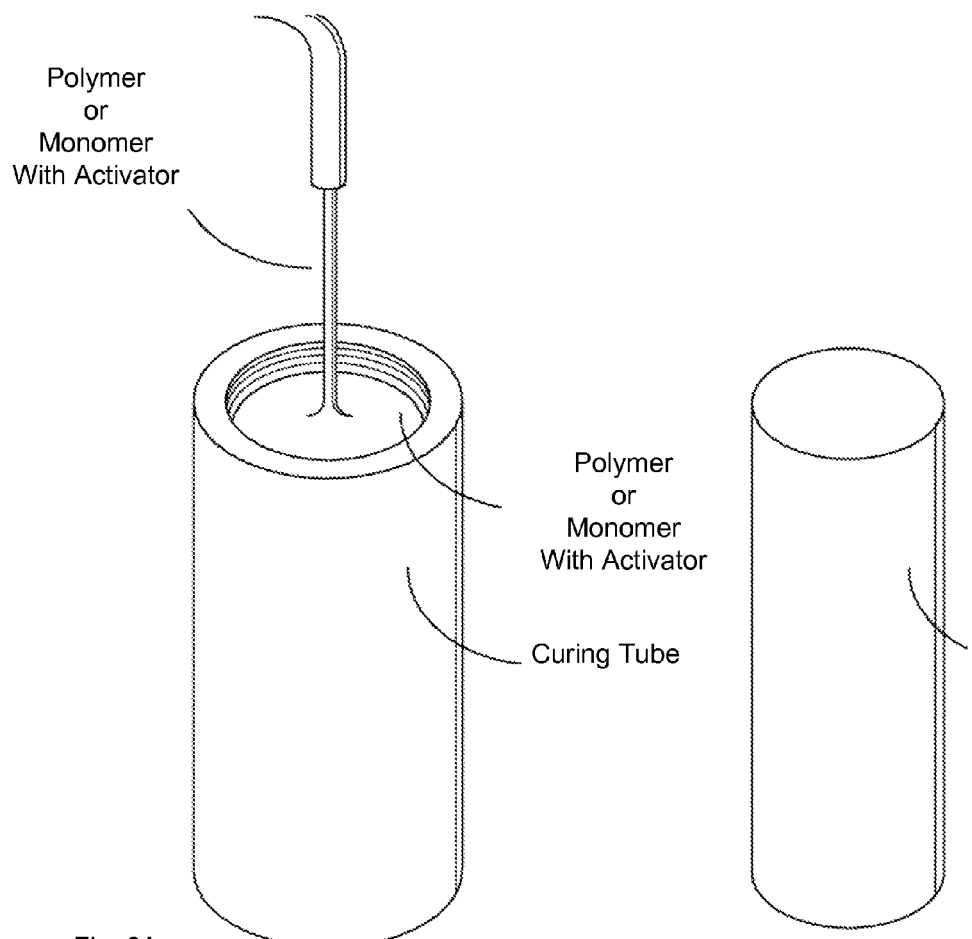
Fig. 2A
Fig. 2B
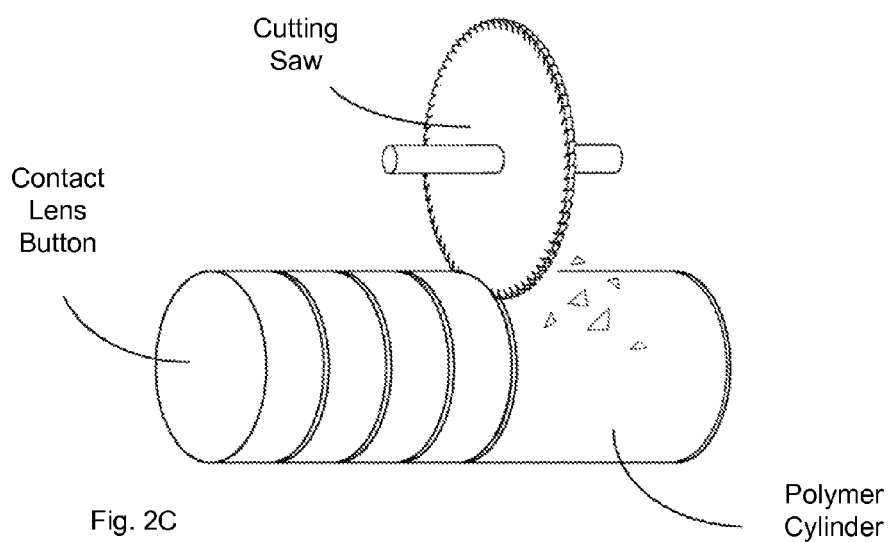
Fig. 2C

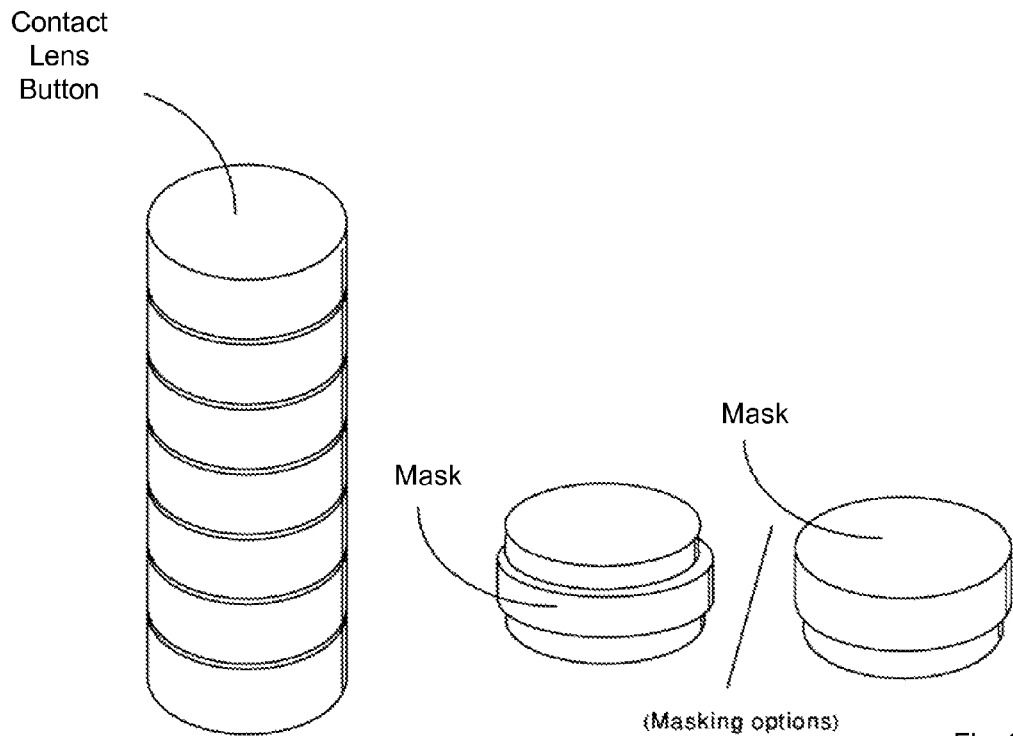
Fig. 2D
Fig. 2E
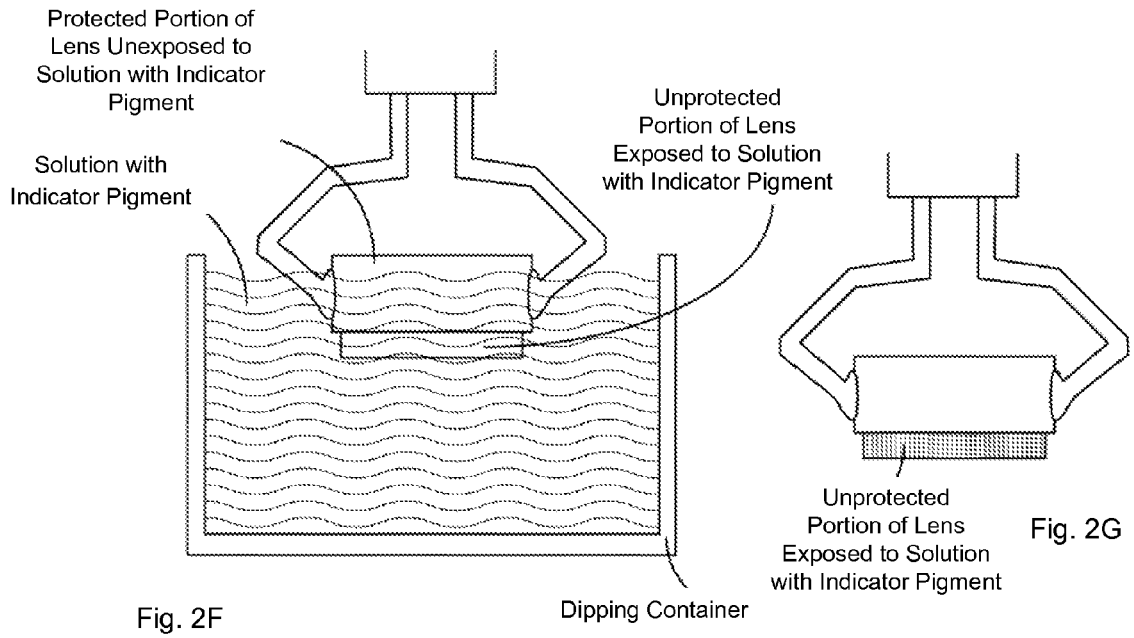
Fig. 2F
Fig. 2G

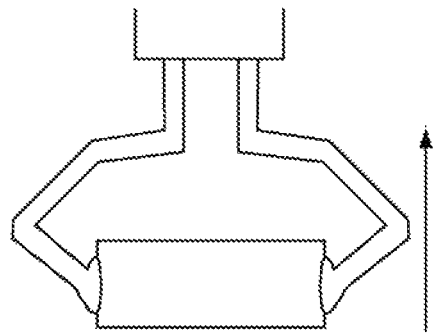
Contact Lens Button With Indicator Pigment Infused or Coated On a Portion Thereof
Fig. 2H
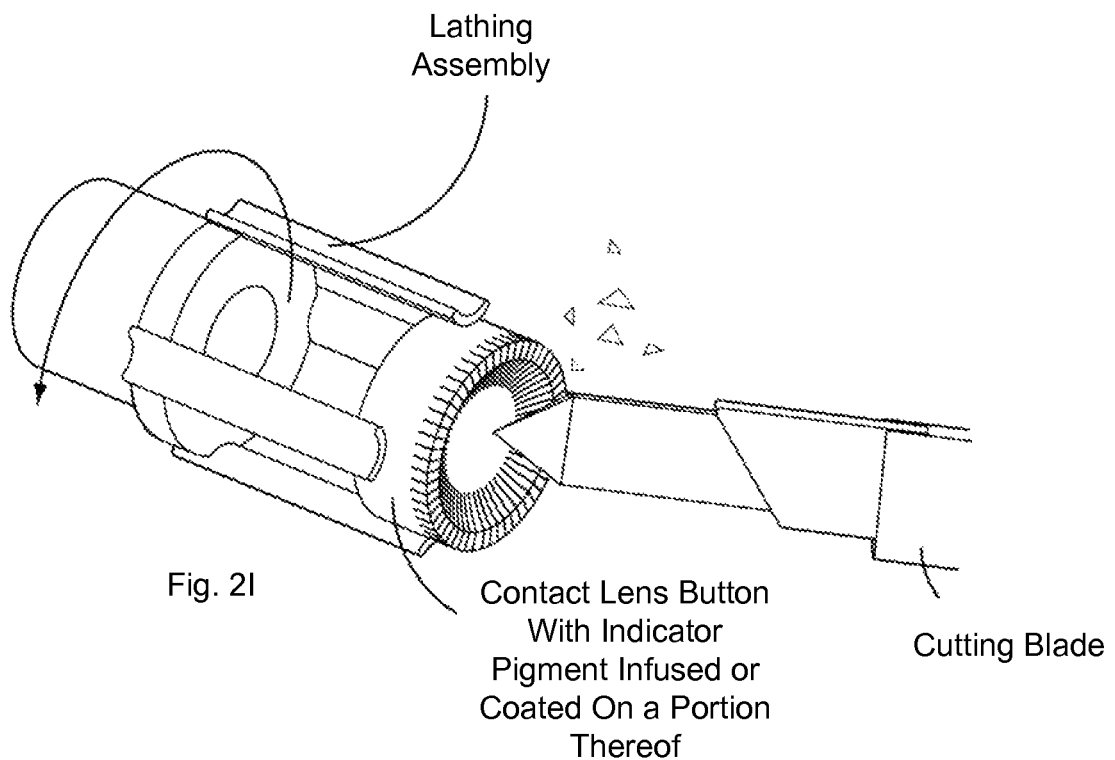
Lathing Assembly
Fig. 2I
Contact Lens Button With Indicator Pigment Infused or Coated On a Portion Thereof
Cutting Blade

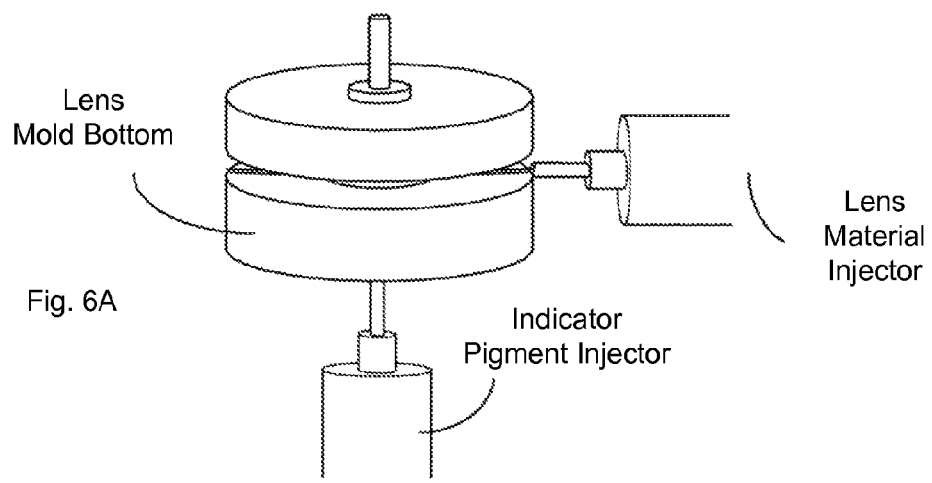
Lens Mold Bottom
Fig. 6A
Lens Material Injector
Indicator Pigment Injector
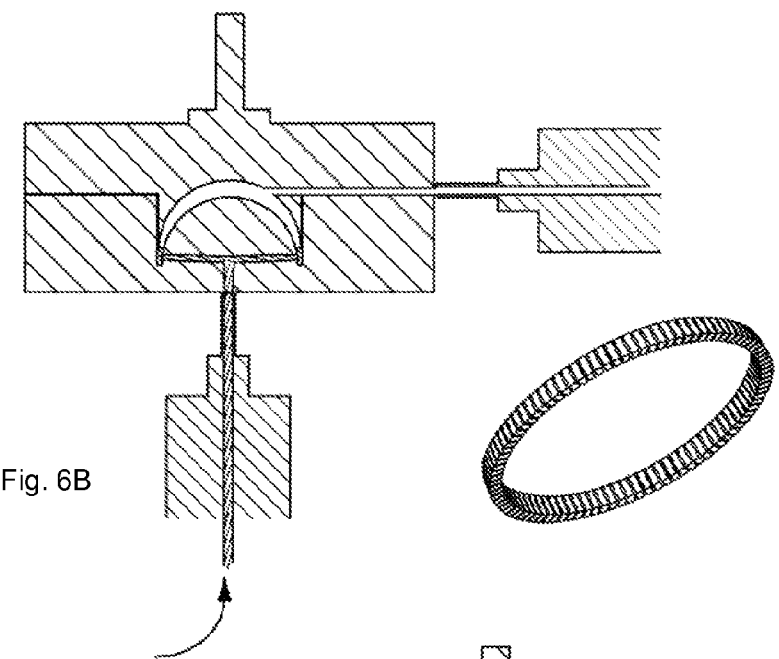
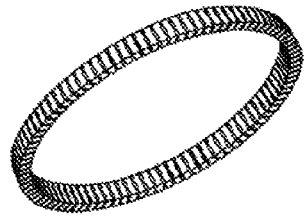
Fig. 6B
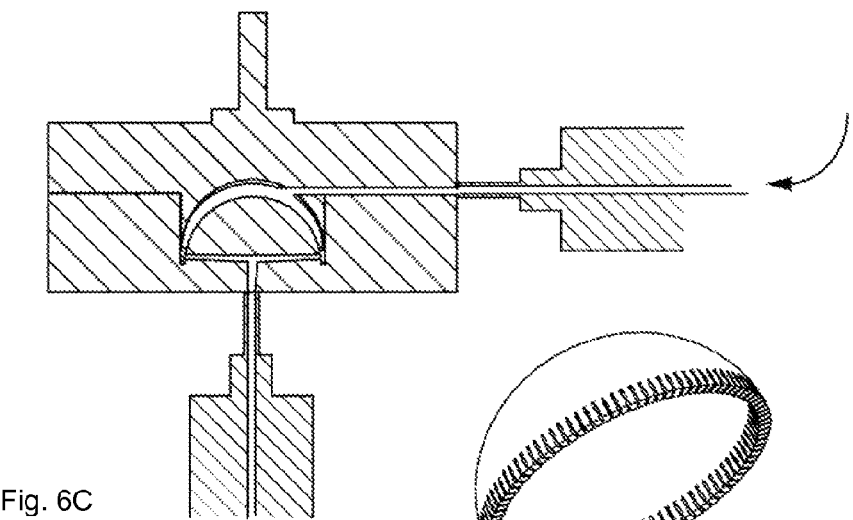
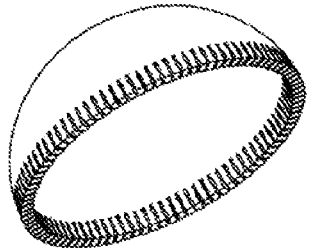
Fig. 6C

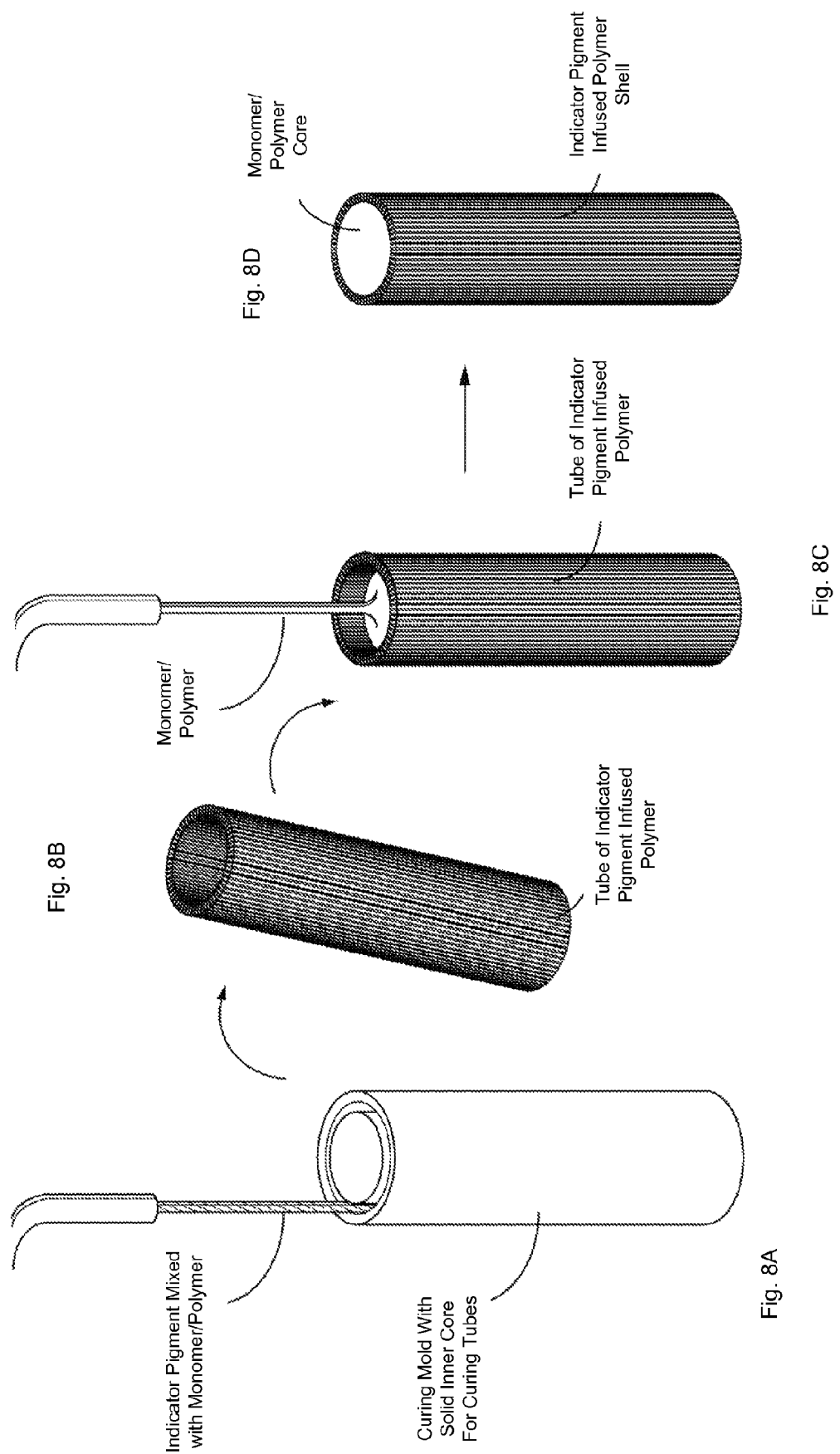

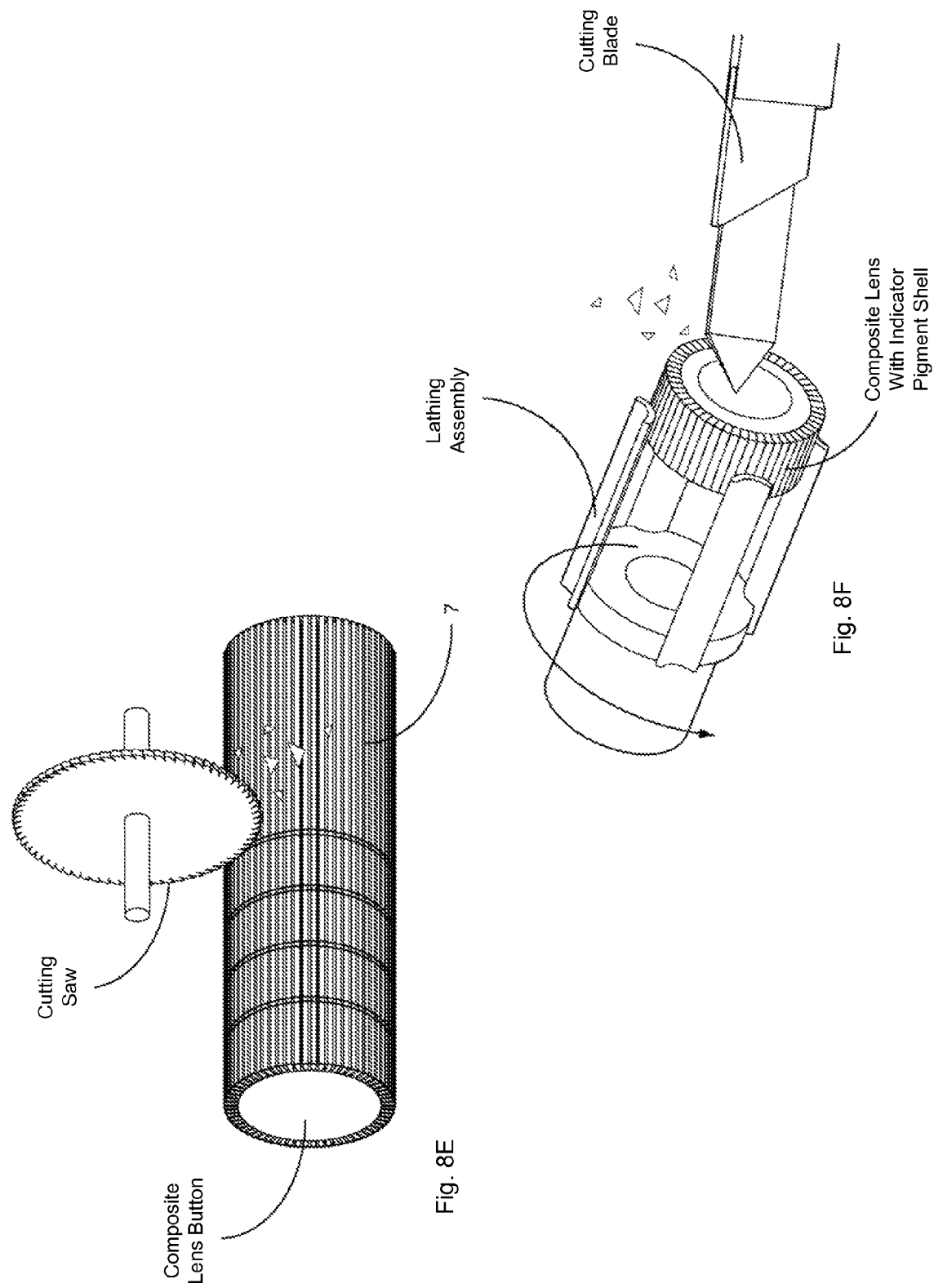

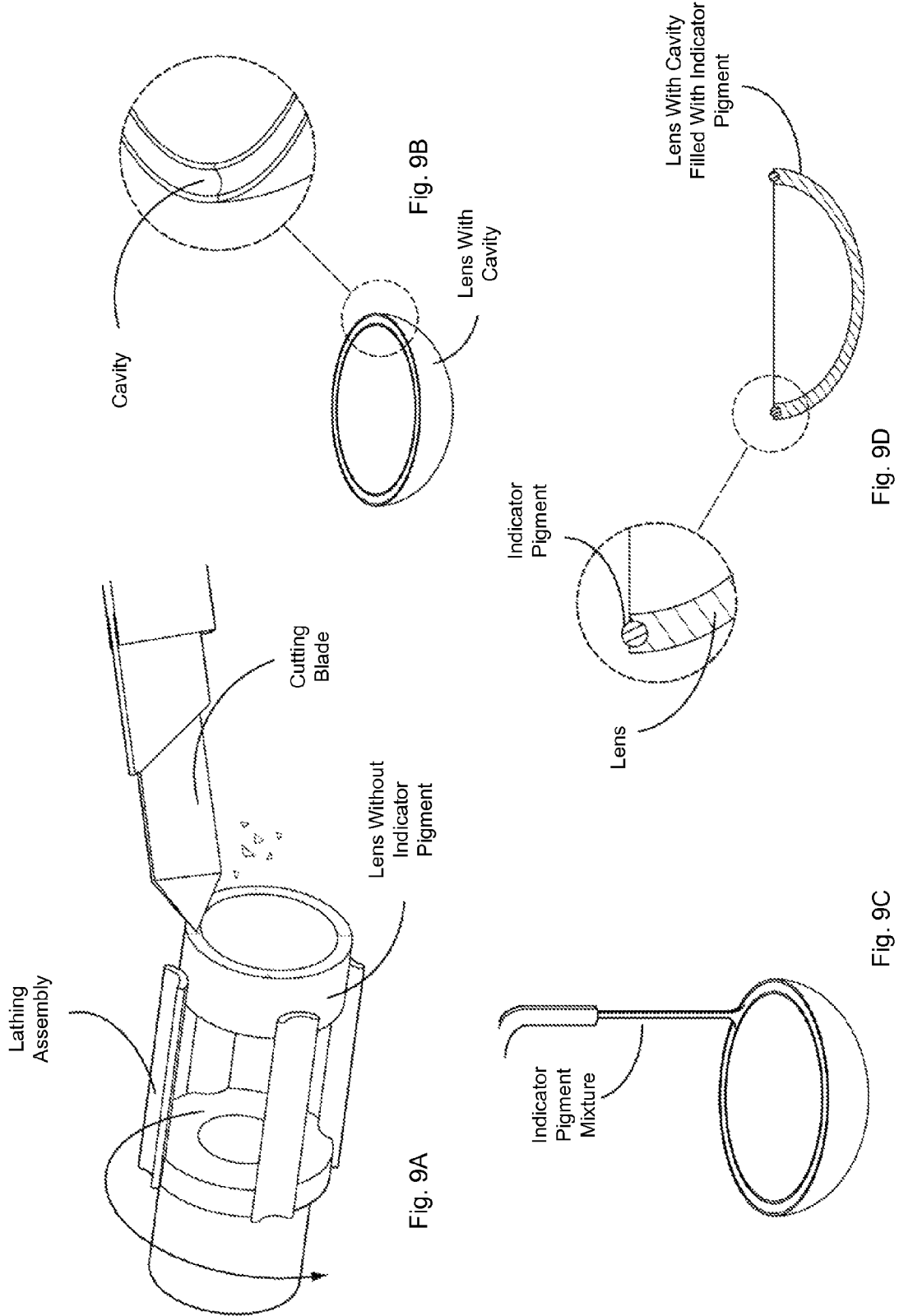

Indicator
Of a 1st Color
Indicator
Of a 2nd Color
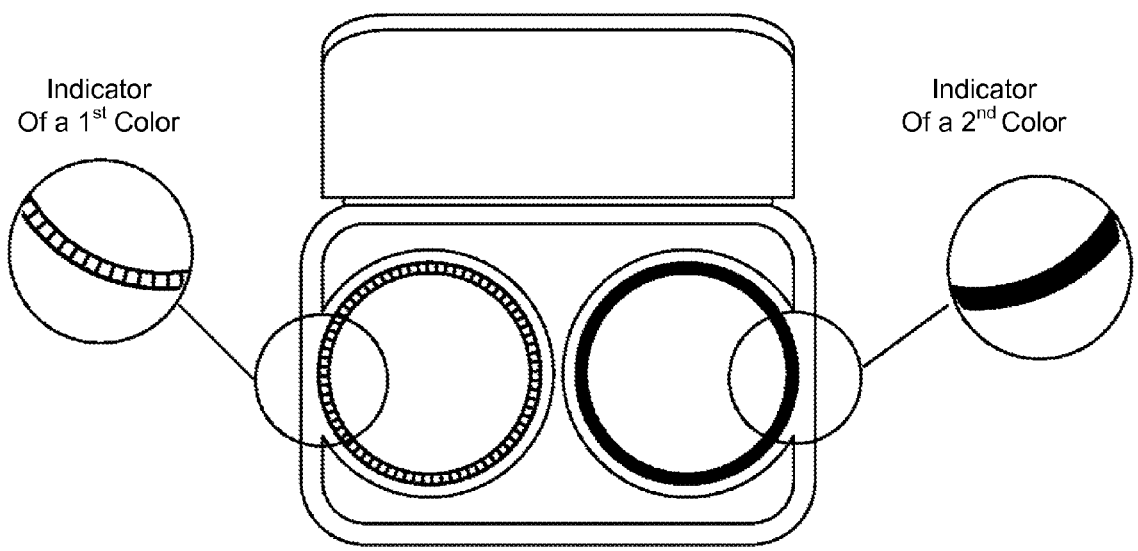
Fig. 10
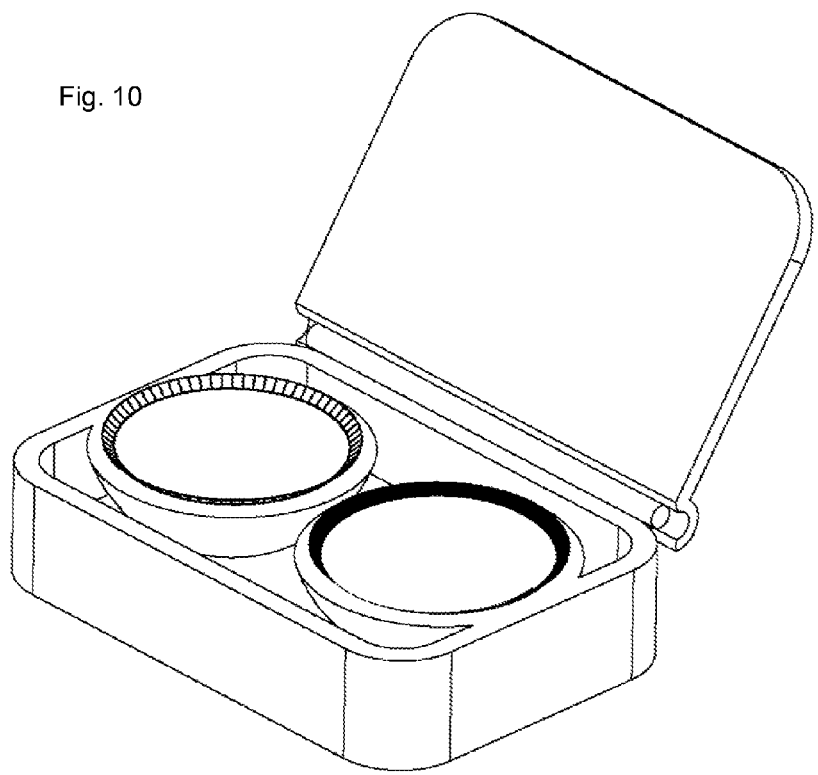

METHODS MATERIALS AND SYSTEMS FOR PRODUCING A CONTACT LENS AND CONTACT LENSES PRODUCED USING SAID METHODS MATERIALS AND SYSTEMS

FIELD OF THE INVENTION

The present invention relates generally to the fields of optometry and/or ophthalmics. More specifically, the present invention relates to a methods, materials and systems for producing contact lenses and contact lenses produced using said methods, materials and systems.

BACKGROUND

A contact lens (also known simply as a contact) is a corrective, cosmetic, or therapeutic lens usually placed on the cornea of the eye. Contact lens usually serve the same corrective purposes as glasses, but are lightweight and virtually invisible. Some cosmetic lenses are deliberately colored to alter the appearance of the eye. However, the majority of contact lens users rely on the contact lens for vision correction to enable them to perform day to day tasks without the need for glasses.

Modern soft contact lenses were invented by the Czech chemist Otto Wichterle and his assistant Drahoslav Lím, who also invented the first gel used for their production. The first contact lenses were made of glass, which caused eye irritation, and were not wearable for extended periods of time. But when William Feinbloom introduced lenses made from polymethyl methacrylate (PMMA or Perspex/Plexiglas), contacts became much more convenient. These PMMA lenses are commonly referred to as "hard" lenses.

However, PMMA lenses have their own side effects: no oxygen is transmitted through the lens to the cornea, which can cause a number of adverse clinical events. In the late 1970s, and through the 1980s and 1990s, improved rigid materials—which were also oxygen-permeable—were developed. Collectively, these polymers are referred to as rigid gas permeable or 'RGP' materials or lenses. One advantage of hard lenses is that, due to their non-porous nature, they do not absorb chemicals or fumes. The absorption of such compounds by other types of contacts can be a problem for those who are routinely exposed to painting or other chemical processes.

Rigid lenses offer a number of unique properties. In effect, the lens is able to replace the natural shape of the cornea with a new refracting surface. This means that a regular (spherical) rigid contact lens can provide good level of vision in people who have astigmatism or distorted corneal shapes as with keratoconus.

While rigid lenses have been around for about 120 years, soft lenses are a much more recent development. The principal breakthrough in soft lenses made by Otto Wichterle led to the launch of the first soft (hydrogel) lenses in some countries in the 1960s and the approval of the 'Soflens' material (polymacon) by the United States FDA in 1971. Soft lenses are immediately comfortable, while rigid lenses require a period of adaptation before full comfort is achieved. The polymers from which soft lenses are manufactured improved over the next 25 years, primarily in terms of increasing the oxygen permeability by varying the ingredients making up the polymers.

A small number of hybrid rigid/soft lenses exist. An alternative technique is piggybacking of contact lenses, a smaller, rigid lens being mounted atop a larger, soft lens. This is done for a variety of clinical situations where a single lens will not provide the optical power, fitting characteristics, or comfort required.

In 1999, 'silicone hydrogels' became available. Silicone hydrogels have both the extremely high oxygen permeability of silicone and the comfort and clinical performance of the conventional hydrogels. These lenses were initially advocated primarily for extended (overnight) wear, although more recently daily (no overnight) wear silicone hydrogels have been approved and launched.

While it provides the oxygen permeability, the silicone also makes the lens surface highly hydrophobic and less "wettable." This frequently results in discomfort and dryness during lens wear. In order to compensate for the hydrophobicity, hydrogels are added (hence the name "silicone hydrogels") to make the lenses more hydrophilic. However, the lens surface may still remain hydrophobic. Hence some of the lenses undergo surface modification processes which cover the hydrophobic sites of silicone. Some other lens types incorporate internal rewetting agents to make the lens surface hydrophilic.

Cosmetic contact lenses are designed to change the appearance of the eye. These lenses may also correct the vision, but some blurring or obstruction of vision may occur as a result of the color or design. In the USA, the Food and Drug Administration frequently calls non-corrective cosmetic contact lenses decorative contact lenses. These types of lenses tend to cause mild irritation on insertion, but after the eyes become accustomed, tend to cause no long term damage. Though it is advised that these lenses not be worn too much, research has shown them to have no direct link to any forms of eye degradation.

Although it is preferable that none cosmetic contact lenses be perfectly clear, many brands of contact lenses are lightly tinted to make them easier to handle. Many commercial lenses are tinted a faint blue to make them more visible when immersed in cleaning and storage solutions. The problem of handling a contact lens is compounded in the event the contact lens is not in a know location, such as in the situation when the lens falls out of a person's hand or eye. The difficulty of finding a lens which has fallen is well known by all contact lens users.

Common problems experienced by regular contact lens wearers, whether they use clear lenses or a tinted lenses, are: (1) retrieving a contact lens from the solution within which it is stored, (2) distinguishing between the right and left lenses which may lead reverse installation, and (3) locating a lens in the event it falls out of the eye or off the finger during insertion or removal. Although problems 1 and 3 may be more obvious, problem 2 is no less important. For users who have different prescriptions between the left and right eye, accidently inserting a contact with a prescription for the right eye into the left eye, and/or visa versa, may lead to impaired vision, discomfort and headaches. There is, therefore, a need in the field of ophthalmics for improved contact lenses and methods of producing same.

SUMMARY OF THE INVENTION

The present invention includes methods, material and systems for producing a contact lens and contact lenses produced using said methods, material and systems. A contact lens according to some embodiments of the present invention may include an extra-ocular indicator ("EOI") adapted to alter in color upon removal of said lens from an eye. The EOI may be adapted to become relatively more visible (e.g. bright color) when the contact lens is outside an eye than when said contact lens is placed in an eye. The EOI may be at least partially composed of a thermochromic or thermochromatic pigment which changes color based on temperature. The EOI may be at least partially composed of a pH responsive pigment which changes color based on pH values of its surroundings. The EOI may be at least partially composed of a pigment adapted to alter in color upon coming in contact with an organic or biologically produced matter (e.g. carbon dioxide, tear duct fluids, etc.).

According to some embodiments, a contact lens may include an EOI which is adapted to become relatively less visible (e.g. substantially clear) when the contact lens is placed in an eye than when said contact lens is outside an eye. The EOI may be at least partially composed of a thermochromic or thermochromatic pigment (the terms thermochromic or thermochromatic may be used interchangeably within this document and refer to any material or pigment, known today to be developed in the future, which changes in color in response to temperature changes). The EOI may be at least partially composed of a pH responsive pigment. The EOI may be at least partially composed of a pigment adapted to alter in color upon coming in contact with a organic or biological matter.

A contact lens according to some embodiments may at least partially be composed of a material selected from the group consisting of a materials identified in the market as: (1) Alphafilcon A, (2) Asmofilcon A, (3) Balafilcon A, (4) Comfilcon A, (5) Enfilcon A, (6) Galyfilcon A, (7) Hilafilcon A, (8) Hilafilcon B, (9) Hioxifilcon, (10) Lotrafilcon B, (11) Methafilcon A, (12) Omafilcon A, (13) Phemfilcon A, (14) Polymacon, (15) Senofilcon, (16) Tetrafilcon A, (17) Vifilcon A, (18) polymethyl methacrylate, (19) hydrophilic gel, (20) silicon, (21) HEMA, (22) GMA, (23) MMA, (24) NVP, (25) xerogeland and (26) rigid gas permeable polymer.

A contact lens according to some embodiments may include an indicator at least partially composed a materials selected from the group: (1) leuco dye, (2) lactone, (3) weak acid, (4) dodecanol, (5) spirolactones, (6) fluorans, (7) spiropyrans, (8) fulgides, (9) bisphenol A, (10) parabens, (11) 1,2,3-triazole derivates, and (12) 4-hydroxycoumarin.

According to some embodiments of the present invention, there may be provided a pair of contact lenses including a first contact lens with a first extra-ocular indicator ("EOI") adapted to alter to a first color upon removal of said first lens from an eye, and a second contact lens with a second extra-ocular indicator ("EOI") adapted to alter to a second color upon removal of said second lens from an eye.

A contact lens according to embodiments of the present invention may be produced using molding, spin molding, lathing and/or any other lens forming process known today or to be devised in the future. The EOI may be embedded in the lens material, optionally at the periphery. The EOI may be inserted into a cavity/channel on the lens, optionally at the periphery. The EOI may be coated on the lens, optionally at the periphery. The EOI may be diffused into the lens material, optionally at the periphery of the lens.

According to some embodiments of the present invention, there may be provided a contact lens with an integrated or otherwise functionally associated extra-ocular indicator ("EOI"). The EOI may be incorporated with or attached to the lens, and may change color in response to a change in an environmental factor experienced by the contact lens. According to further embodiments of the present invention, the EOI may become substantially clear, transparent or translucent when the contact lens experiences an environmental factor indicative of the lens being worn on an eye. The EOI may become colored (e.g. red, blue, black, green, etc.) when the contact lens experiences an environmental factor indicative of the lens being outside the eye, for example when the lens is inside storage/cleaning solution or when the lens falls out of the eye.

The contact lens according to some embodiments may be a permanent contact lens, a disposable soft contact lens or a hard contact lens which has been impregnated or coated with a EOI. The EOI may be a temperature sensitive/variant pigmentation (i.e. thermo-chromatic substance/pigmentation). The pigmentation may be applied across all or only to a portion of the lens. According to some embodiments of the present invention, the pigmentation may be applied in a pattern at or near an outer edge or periphery of the lens.

According to embodiments where the EOI is a thermochromatic pigmentation, the pigment may be adapted (i.e. selected and/or chemically engineered) to be transparent, clear or translucent at, near or above average body temperature (e.g. above 31 C to 38 C). The pigmentation may further be adapted to change in color to a visible color such as red, blue or green when at a temperature below some threshold temperature (e.g. below 30 C to 33 C), where the threshold is temperature is associated with the lens being outside the eye.

According to some embodiments, the EOI coloring may facilitate easy localization (i.e. finding) of the contact lens when being removed from its packaging or in the event it falls out of a person's hand or eye. According to further embodiments, a color of a contact lenses EOI indicate whether the lenses is intended for the right or left eye. Providing a pair of lenses having different colored EOI's for each lens may mitigate the possibility of the wrong lens being inserted in the wrong eye (e.g. left lens into right eye, or right lens into left eye).

DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A through 2I are illustrations of an exemplary contact lens production method according to some embodiments of the present invention, where a contact lens is fabricated using a lathing process and later impregnated with an EOI;

FIGS. 6A through 6C are illustrations of an exemplary contact lens production method according to some embodiments of the present invention where a contact lens is fabricated using a molding process which embeds the EOI during curing;

FIGS. 8A through 8F are illustrations of an exemplary composite contact lens production method according to some embodiments of the present invention where a composite contact lens (EOI shell with Clean Polymer Core) button is fabricated using a duel pouring process and the button is later lathed into a contact lens;

FIGS. 9A through 9D are illustrations of an exemplary contact lens production method according to some embodiments of the present invention where a channel or cavity is either fabricated with or added to a contact lens and the channel/cavity is filled with the EOI, possibly in an EOI mixture with another material;

FIG. 10 is an illustration of a contact lens pair within a storage container according to embodiments of the present invention where the each contact lens has an EOI of a different color;

Figure 1A:
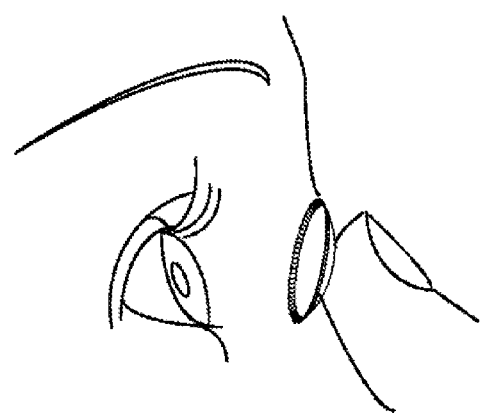
FIGS. 1A through 1F are illustrations showing various stages of coloration of an exemplary contact lenses according to some embodiments of the present invention as the lens is being installed in an eye and later as it drops out of the eye.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

The present invention includes methods, material and systems for producing a contact lens and contact lenses produced using said methods, material and systems. A contact lens according to some embodiments of the present invention may include an extra-ocular indicator ("EOI") adapted to alter in color upon removal of said lens from an eye. The EOI may be adapted to become relatively more visible (e.g. bright color) when the contact lens is outside an eye than when said contact lens is placed in an eye. The EOI may be at least partially composed of a thermochromic or thermochromatic pigment which changes color based on temperature. The EOI may be at least partially composed of a pH responsive pigment which changes color based on pH values of its surroundings. The EOI may be at least partially composed of a pigment adapted to alter in color upon coming in contact with an organic or biologically produced matter (e.g. carbon dioxide, tear duct fluids, etc.).

According to some embodiments, a contact lens may include an EOI which is adapted to become relatively less visible (e.g. substantially clear) when the contact lens is placed in an eye than when said contact lens is outside an eye. The EOI may be at least partially composed of a thermochromic or thermochromatic pigment (the terms thermochromic or thermochromatic may be used interchangeably within this document and refer to any material or pigment, known today to be developed in the future, which changes in color in response to temperature changes). The EOI may be at least partially composed of a pH responsive pigment. The EOI may be at least partially composed of a pigment adapted to alter in color upon coming in contact with a organic or biological matter.

A contact lens according to some embodiments may at least partially be composed of a material selected from the group consisting of a materials identified in the market as: (1) Alphafilcon A, (2) Asmofilcon A, (3) Balafilcon A, (4) Comfilcon A, (5) Enfilcon A, (6) Galyfilcon A, (7) Hilafilcon A, (8) Hilafilcon B, (9) Hioxifilcon, (10) Lotrafilcon B, (11) Methafilcon A, (12) Omafilcon A, (13) Phemfilcon A, (14) Polymacon, (15) Senofilcon, (16) Tetrafilcon A, (17) Vifilcon A, (18) polymethyl methacrylate, (19) hydrophilic gel, (20) silicon, (21) HEMA, (22) GMA, (23) MMA, (24) NVP, (25) xerogeland and (26) rigid gas permeable polymer.

A contact lens according to some embodiments may include an indicator at least partially composed a materials selected from the group: (1) leuco dye, (2) lactone, (3) weak acid, (4) dodecanol, (5) spirolactones, (6) fluorans, (7) spiropyrans, (8) fulgides, (9) bisphenol A, (10) parabens, (11) 1,2,3-triazole derivates, and (12) 4-hydroxycoumarin.

According to some embodiments of the present invention, there may be provided a pair of contact lenses including a first contact lens with a first extra-ocular indicator ("EOI") adapted to alter to a first color upon removal of said first lens from an eye, and a second contact lens with a second extra-ocular indicator ("EOI") adapted to alter to a second color upon removal of said second lens from an eye.

A contact lens according to embodiments of the present invention may be produced using molding, spin molding, lathing and/or any other lens forming process known today or to be devised in the future. The EOI may be embedded in the lens material, optionally at the periphery. The EOI may be inserted into a cavity/channel on the lens, optionally at the periphery. The EOI may be coated on the lens, optionally at the periphery. The EOI may be diffused into the lens material, optionally at the periphery of the lens.

According to some embodiments of the present invention, there may be provided a contact lens with an integrated or otherwise functionally associated extra-ocular indicator ("EOI"). The EOI may be incorporated with or attached to the lens, and may change color in response to a change in an environmental factor experienced by the contact lens. According to further embodiments of the present invention, the EOI may become substantially clear, transparent or translucent when the contact lens experiences an environmental factor indicative of the lens being worn on an eye. The EOI may become colored (e.g. red, blue, black, green, etc.) when the contact lens experiences an environmental factor indicative of the lens being outside the eye, for example when the lens is inside storage/cleaning solution or when the lens falls out of the eye.

The contact lens according to some embodiments may be a permanent contact lens, a disposable soft contact lens or a hard contact lens which has been impregnated or coated with a EOI. The EOI may be a temperature sensitive/variant pigmentation (i.e. thermo-chromatic substance/pigmentation). The pigmentation may be applied across all or only to a portion of the lens. According to some embodiments of the present invention, the pigmentation may be applied in a pattern at or near an outer edge or periphery of the lens.

According to embodiments where the EOI is a thermochromatic pigmentation, the pigment may be adapted (i.e. selected and/or chemically engineered) to be transparent, clear or translucent at, near or above average body temperature (e.g. above 31 C to 38 C). The pigmentation may further be adapted to change in color to a visible color such as red, blue or green when at a temperature below some threshold temperature (e.g. below 30 C to 33 C), where the threshold is temperature is associated with the lens being outside the eye.

According to some embodiments, the EOI coloring may facilitate easy localization (i.e. finding) of the contact lens when being removed from its packaging or in the event it falls out of a person's hand or eye. According to further embodiments, a color of a contact lenses EOI indicate whether the lenses is intended for the right or left eye. Providing a pair of lenses having different colored EOI's for each lens may mitigate the possibility of the wrong lens being inserted in the wrong eye (e.g. left lens into right eye, or right lens into left eye).

The present invention includes methods, material and systems for providing contact lenses and includes the lenses produced by the aforementioned methods, material and systems. In the following detailed description, numerous specific details are set forth in order to provide a thorough understanding of the invention. However, it will be understood by those skilled in the art that the present invention may be practiced without these specific details. In other instances, well-known methods, procedures, chemicals, components, mechanical assemblies and circuits have not been described in detail so as not to obscure the present invention.

According to some embodiments of the present invention, a contact lens, such as a disposable contact lens or a hard contact lens, may be produced with, impregnated or coated with a EOI material or pigment. The contact lens may produced by any contact lens production process known today or to be devised in the future, including but not limited to those which produce:

I. Spin-cast lenses—A spin cast lens is a soft contact lens manufactured by whirling liquid silicone in a revolving mold at high speed.

II. Lathe turned—A lathe turned contact lens is cut and polished on a CNC lathe. The lens starts out as a cylindrical disk held in the jaws of the lathe. The lathe is equipped with an industrial grade diamond as the cutting tool. The CNC Lathe turns at nearly 6000 RPM (revolutions per minute) as the cutter removes the desired amount of material from the inside of the lens. The concave (inner) surface of the lens is then polished with some fine abrasive paste, oil, and a small polyester cottonball turned at high speeds. In order to hold the delicate lens in reverse manner, wax is used as an adhesive. The convex (outer) surface of the lens is thus cut and polished by the same process.

III. Molded—Moulding is used to manufacture some brands of soft contact lenses. Rotating moulds are used and the molten material is added and shaped by centrifugal forces. Injection moulding and computer control are also used to create nearly perfect lenses.

IV. Hybrids such as composite lenses including both hard and soft material adhered to one another.

According to embodiments of the present invention, the EOI material/pigment may be applied across all or a portion of the lens. According to some embodiments of the present invention, the EOI material/pigment may be embedded or applied in a pattern at or near an outer edge or periphery of the lens.

According to some embodiments, the EOI may be a thermochromatic material pigment. The thermo-chromatic pigmentation may be adapted (i.e. selected and/or chemically engineered) to be transparent, clear or translucent at, near or above average body temperature at the eye (e.g. 32 C to 38 C or above). The pigmentation may further be adapted to change in color to a visible color such as red, blue or green when at a temperature below some threshold temperature (e.g. below 32 C) associated with the lens being outside the eye. The pigmentation coloring may facilitate easy localization (i.e. finding) of the contact lens when being removed from its packaging or in the event it falls out of a person's hand or eye. Any thermochromatic substance or composition, known today or to be composed/discovered in future, exhibiting a clear appearance at or above human body temperature and a visible color at or below some temperature below human body temperature may be applicable to the present invention. Examples of known thermochromatic materials are:

Thermochromatic Materials

Thermochromatic Liquid Crystals (TLCs)

Some liquid crystals are capable of displaying different colors at different temperatures. This change is dependent on selective reflection of certain wavelengths by the crystallic structure of the material, as it changes between the low-temperature crystallic phase, through anisotropic chiral or twisted nematic phase, to the high-temperature isotropic liquid phase. Only the nematic mesophase has thermochromic properties; this restricts the effective temperature range of the material.

The twisted nematic phase has the molecules oriented in layers with regularly changing orientation, which gives them periodic spacing. The light passing the crystal undergoes Bragg diffraction on these layers, and the wavelength with the greatest constructive interference is reflected back, which is perceived as a spectral color. A change in the crystal temperature can result in a change of spacing between the layers and therefore in the reflected wavelength. The color of the thermochromic liquid crystal can therefore continuously range from non-reflective (black) through the spectral colors to black again, depending on the temperature. Typically, the high temperature state will reflect blue-violet, while the low-temperature state will reflect red-orange. Since blue is a shorter wavelength than red, this indicates that the distance of layer spacing is reduced by heating through the liquid-crystal state.

Some such materials are cholesteryl nonanoate or cyanobiphenyls.

Liquid crystals used in dyes and inks often come microencapsulated, in the form of suspension. These suspensions can be embedded within contact lens. These suspension can also me mixed with a binder material and coated onto a surface of a contact lens.

Leuco Dyes

A leuco dye is a dye whose molecules can acquire two forms, one of which is colorless. For example, the spiro form of an oxazine is a colorless leuco dye; the conjugated system of the oxazine and another aromatic part of the molecule is separated by an sp3-hybridized "spiro" carbon. After protonating a part of the molecule, irradiation with UV light (see Photochromism), or introducing other kind of such change, the bond between the spiro carbon and the oxazine interrupts, the ring opens, the spiro carbon achieves sp2 hybridization and becomes planar, the aromatic group rotates, aligns its π-orbitals with the rest of the molecule, and a conjugated system forms, with ability to absorb photons of visible light, and therefore appear colorful.

Another example of a leuco dye is the crystal violet lactone, which in its lactone form is colorless or slightly yellowish, but in low pH, when it is protonated, it becomes intensely violet. Other examples are phenolphthalein and thymolphthalein, colorless in acidic to neutral pH, but becoming pink and blue in alkaline environment. Other example are many redox indicators, which undergo reversible color change between colored and colorless form at a specific electrode potential.

Leuco dyes are a key component of some thermochromic dyes and thermal printer papers, photochromic materials, and of the Flexplay DVD discs with limited play time, where e.g. leuco form of methylene blue is used.

Thermochromic dyes are based on mixtures of leuco dyes with suitable other chemicals, displaying a color change (usually between the colorless leuco form and the colored form) in dependence on temperature. The dyes are rarely applied on materials directly; they are usually in the form of microcapsules with the mixture sealed inside. An illustrative example is the Hypercolor fashion, where microcapsules with crystal violet lactone, weak acid, and a dissociable salt dissolved in dodecanol are applied to the fabric; when the solvent is solid, the dye exists in its lactone leuco form, while when the solvent melts, the salt dissociates, the pH inside the microcapsule lowers, the dye becomes protonated, its lactone ring opens, and its absorption spectrum shifts drastically, therefore it becomes deeply violet. In this case the apparent thermochromism is in fact halochromism.

The dyes most commonly used are spirolactones, fluorans, spiropyrans, and fulgides. The weak acids include bisphenol A, parabens, 1,2,3-triazole derivates, and 4-hydroxycoumarin and act as proton donors, changing the dye molecule between its leuco form and its protonated colored form; stronger acids would make the change irreversible.

Leuco dyes have less accurate temperature response than liquid crystals, and are used in applications where accuracy is not required. They are suitable for general indicators of approximate temperature ("too cool", "too hot", "about OK"), or for various novelty items. They are usually used in combination with some other pigment, producing a color change between the color of the base pigment and the color of the pigment combined with the color of the non-leuco form of the leuco dye. Organic leuco dyes are available for temperature ranges between about −5° C. and 60° C., in wide range of colors. The color change usually happens in a 3° C. interval.

Leuco dyes are used in applications where temperature response accuracy is not critical: eg. novelties, bath toys, flying discs, and approximate temperature indicators for microwave-heated foods. Microencapsulation allows their use in wide range of materials and products. The size of the microcapsules typically ranges between 3-5 μm (over 10 times larger than regular pigment particles), which requires some adjustments to printing and manufacturing processes.

The encapsulated die may be embedded into a relevant portion (e.g. around the periphery) of a contact lens according to some embodiments of the present invention. The encapsulated die may also be mixed with a binder and coated onto a relevant portion (e.g. around the periphery) of a contact lens according to some embodiments of the present invention. Thermochromatic dies produced by Thermographic Measurements Ltd. of the United Kingdom (e.g. CHROMAZONE DISPERSION BIS A FREE) may be applicable to embodiments of the present invention.

According to further embodiments of the present invention, the EOI may be a pH sensitive/responsive pigment. The following are some materials which may be relevant to embodiments of the present invention:

Acidity/Basicity Indicator Based Embodiments

According to some embodiments of the present invention, the EOI may change color responsive to a change in acidity or basicity. pH is a measure of the acidity or basicity of a solution. It approximates but is not equal to p[H], the negative logarithm (base 10) of the molar concentration of dissolved hydrogen ions (H+). Crudely, this matches the number of places behind the decimal point, so for example 0.1 molar hydrochloric acid should be near pH 1 and 0.0001 molar HCl should be near pH 4. Pure water itself is a weak acid, dissociating to produce a pH of 7, or 0.0000001 M H+. For an aqueous solution to have a higher pH, a base must be dissolved in it, which binds away many of these rare hydrogen ions. Hydrogen ions in water can be written simply as H+ or as hydronium (H3O+) or higher species (e.g. H9O4+) to account for solvation, but all describe the same entity.

However, pH is not precisely pH, but takes into account an activity factor, which represents the tendency of hydrogen ions to interact with other components of the solution, which affects among other things the electrical potential read using a pH meter. As a result, pH can be affected by the ionic strength of a solution—for example, the pH of a 0.05 M potassium hydrogen phthalate solution can vary by as much as 0.5 pH units as a function of added potassium chloride, even though the added salt is neither acidic nor basic.

Unfortunately, hydrogen ion activity coefficients cannot be measured directly by any thermodynamically sound method, so they are based on theoretical calculations. Therefore the pH scale is defined in practice as traceable to a set of standard solutions whose pH is established by international agreement. Primary pH standard values are determined by the Harned cell, a hydrogen gas electrode, using the Bates-Guggenheim Convention.

Pure water is said to be neutral, with a pH close to 7.0 at 25° C. (77° F.). Solutions with a pH less than 7 are said to be acidic and solutions with a pH greater than 7 are said to be basic or alkaline. pH measurements are important in medicine, biology, chemistry, food science, environmental science, oceanography and many other applications.

A pH indicator is a halochromic chemical compound that is added in small amounts to a solution so that the pH (acidity or basicity) of the solution can be determined visually. Hence a pH indicator is a chemical detector for hydronium ions (H3O+) (or Hydrogen ions (H+) in the Arrhenius model). Normally, the indicator causes the color of the solution to change depending on the pH. At 25 degrees Celsius, considered the standard temperature, the pH value of a neutral solution is 7.0. Solutions with a pH value below 7.0 are considered acidic, whereas solutions with pH value above 7.0 are basic. As most naturally occurring organic compounds are weak protolytes, carboxylic acids and amines, pH indicators find many applications in biology and analytical chemistry. Moreover, pH indicators form one of the three main types of indicator compounds used in chemical analysis. For the quantitative analysis of metal cations, the use of complexometric indicators is preferred, whereas the third compound class, the redox indicators, are used in titrations involving a redox reaction as the basis of the analysis.

Lens Fabrication Lab Experiment Parameters 2009/2010

Contact lenses were fabricated using HEMA, GMA, MMA (circa w/v 3%), NVP (circa w/v 4%), a cross linking agent EGDMA (circa w/v 0.2%), and a chemical initiator V65 (circa w/v 0.1%) (a colorant and a UV blocker are optional). This produced a xerogel (dry polymer) which was later hydrated after cutting the correct curves to obtain the water content.

Polymerization was by controlled heat in water bath at 25 C to 35 Deg C. depending on formulation. Co-polymer of HEMA and GMA were also used.

Some fabrications were carried with addition of EOI pigment to a HEMA monomer mix. The concentrations of pigment used were 0.05% concentration of Chromazone (0.1% of the slurry). Using our Ultra Turrax high shear mixer we obtained an immediate and effective dispersion of the Chromazone particles in the HEMA monomer. Twice the normal level of initiator were added in order to obtain a rapid cure, and Polymerization took place at 25° C. Following polymerization in the water bath for 24 hours, a post cure was carried out at 45° C. for 24 hrs. The resulting polymer rod was trimmed into 12.7 mm×5 mm blanks (contact lens button) and later lathed into contact lenses. The resulting contact lens exhibited color changing properties such that they exhibited red color when below 31 C and became substantially clear when their temperature was elevated to near or above body temperature.

Figure 1B:
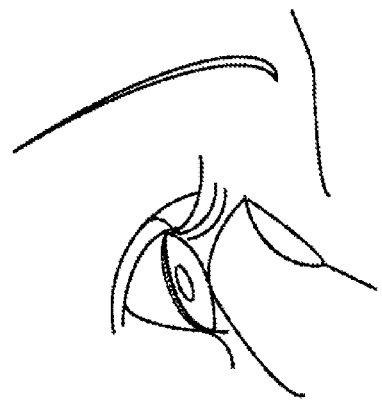
Figure 1C:
Figure 1D:
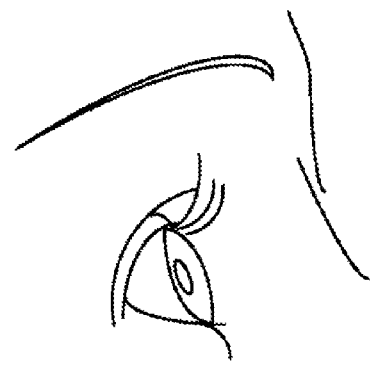
Figure 1E:
Figure 1F:
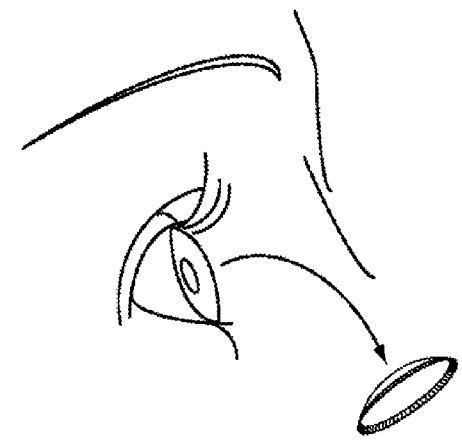

Turning now to FIGS. 1A through 1F, there shown illustrations of various stages of coloration of an exemplary contact lenses according to some embodiments of the present invention as the lens is being installed in an eye and later as it drops out of the eye. While the contact lens is outside the eye, the EOI is visible (FIG. 1A) and remains so for a short period of time after installation into the eye (FIGS. 1B & 1C). Within several seconds of installation, the EOI becomes clear (FIG. 1D). Upon falling out or ejection from the eye (FIG. 1E) the EOI remain clear for several seconds and then becomes colored (FIG. 1F).

Turning now to FIGS. 2A through 2I, there are shown illustrations of an exemplary contact lens production method according to some embodiments of the present invention, where a contact lens is fabricated using a lathing process and later impregnated with an EOI. A monomer, cross-linking agent and activator (e.g. polymer in the making) are poured into the tube (FIG. 2A), and after curing a polymer rod/cylinder are formed. The rod is cut into buttons (FIGS. 2C & 2D) and the buttons are partially masked using some suitable masking material (e.g. wax). The masked buttons are then immersed in a solution including the EOI (FIG. 2F) and upon the EOI impregnating or coating the unmasked portion of the button, the button is removed from the solution (FIG. 2G). The mask is removed (FIG. 2H) and the button is lathed into a lens (FIG. 2I).

Figure 3A:
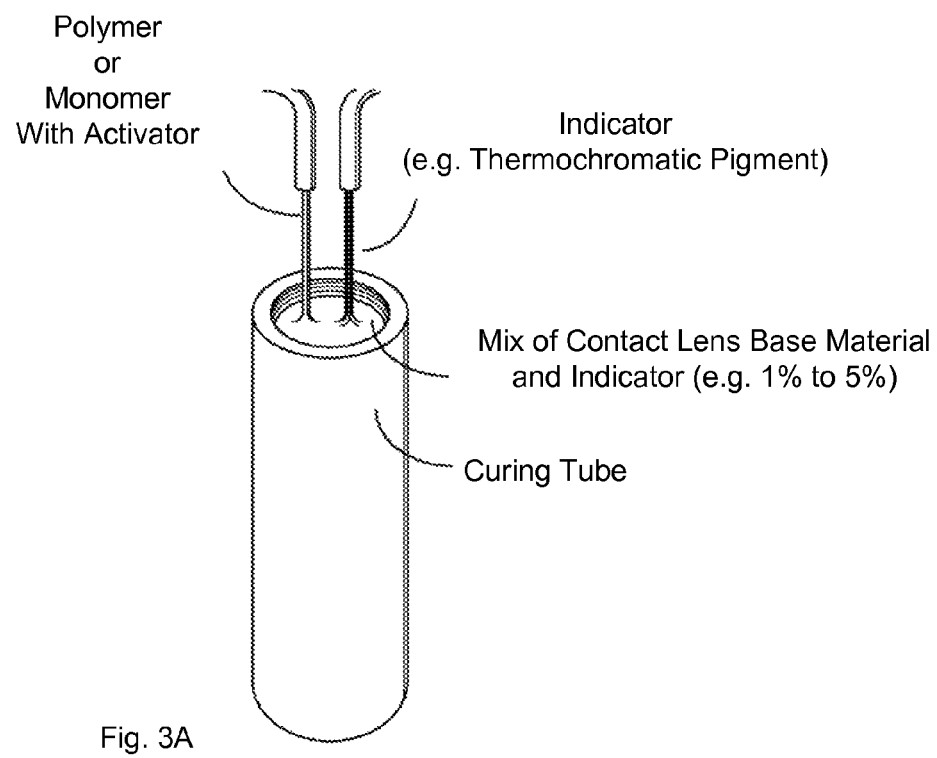
FIGS. 3A & 3B are illustrations of an exemplary contact lens production method according to some embodiments of the present invention where the contact lenses are fabricated using a spinning process.
Figure 3B:
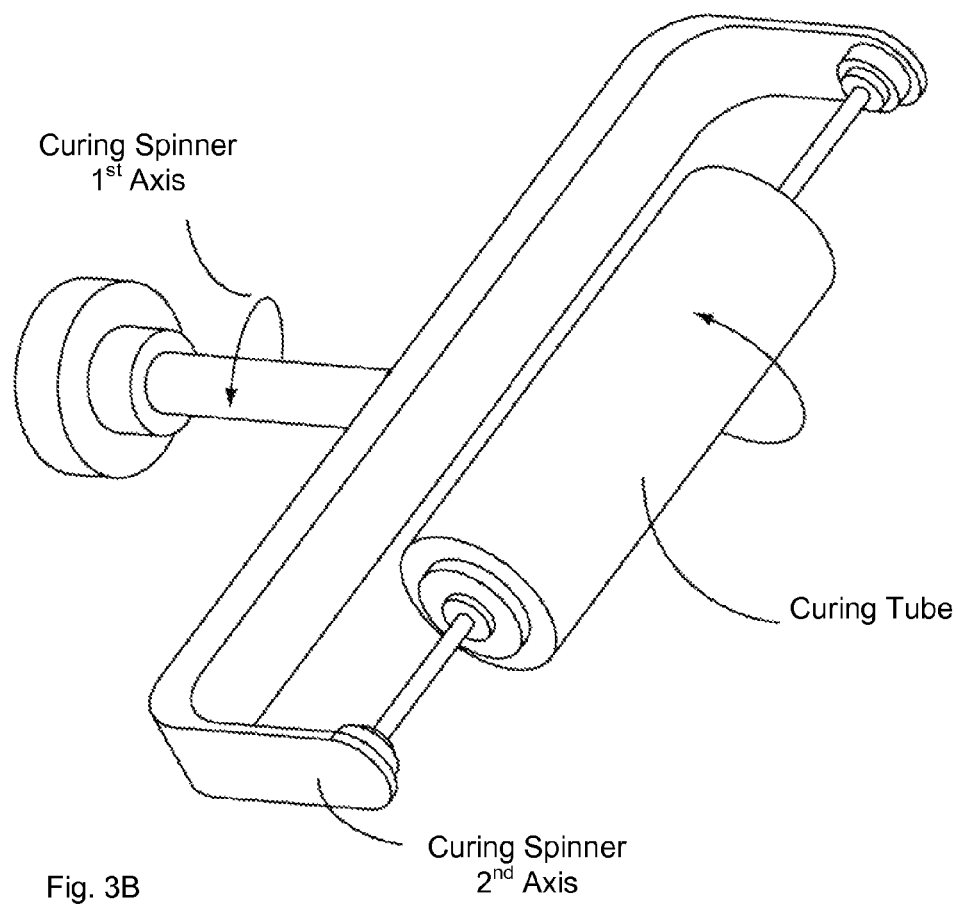
Figure 4A:
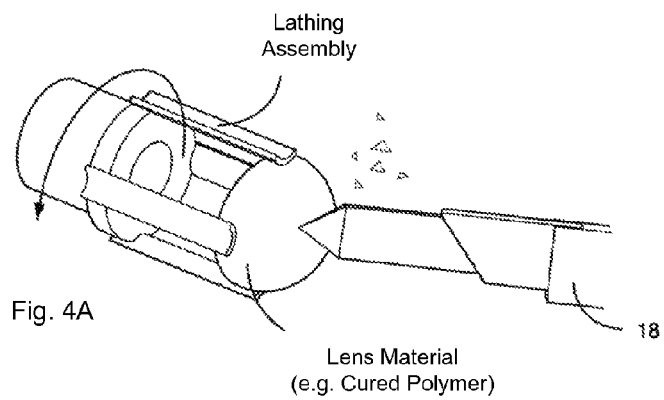
FIGS. 4A through 4D are illustrations of an exemplary contact lens production method according to some embodiments of the present invention where a contact lens is fabricated using a lathing process and later impregnated with an EOI.
Figure 4B:
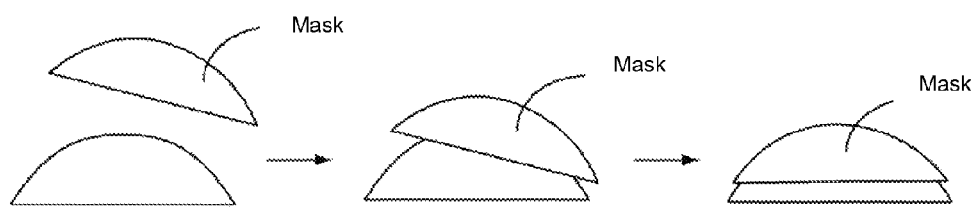
Figure 4C:
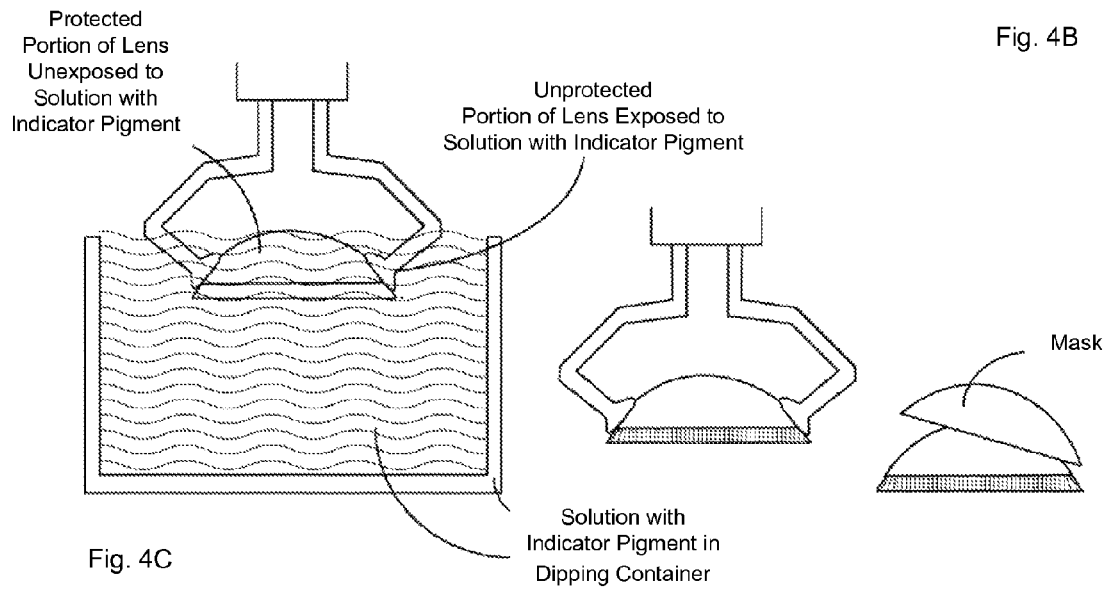
Figure 4D:
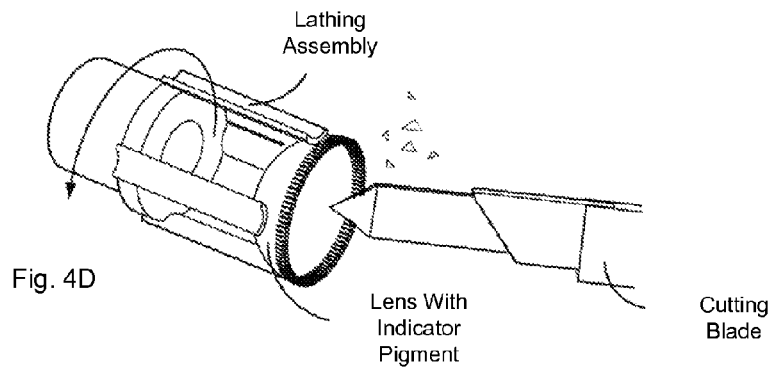

Turning now to FIGS. 3A & 3B, there are shown illustrations of an exemplary contact lens production method according to some embodiments of the present invention where the contact lenses are fabricated using a spinning process. According to this method, the EOI is mixed with the monomer in a tube and the tube is spun in either one or two axis either before or during curing.

Turning now to FIGS. 4A through 4D, there are shown illustrations of an exemplary contact lens production method according to some embodiments of the present invention where a contact lens is fabricated using a lathing process and later impregnated with an EOI. This process has a similar flow to the one shown in FIGS. 2A through 2I, except the contact lens is partially lathed before masking and then the inner surface of the contact lens is lathed after exposing an unmasked portion of the contact lens to a solution including the EOI.

Figures 5A, 5B:
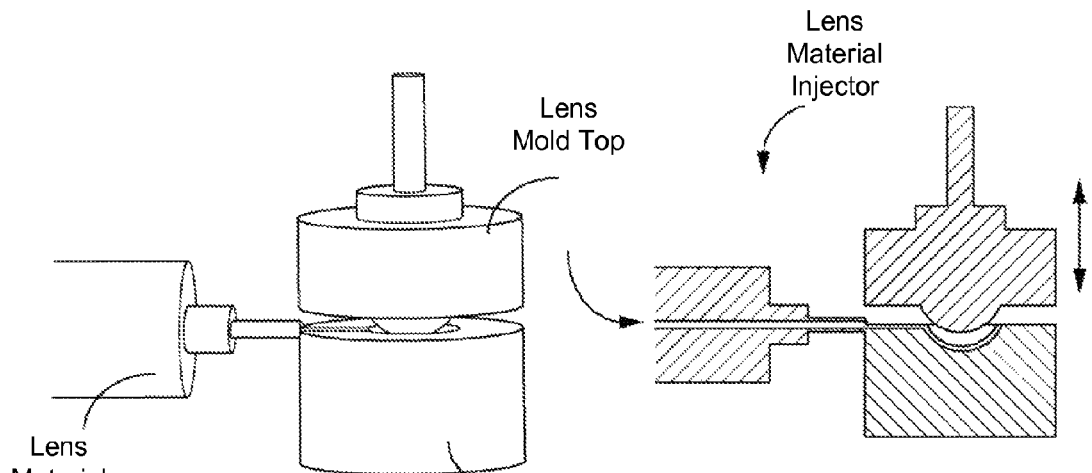
FIGS. 5A through 5D are illustrations of an exemplary contact lens production method according to some embodiments of the present invention where a contact lens is fabricated using a molding process and later impregnated with an EOI.
Figure 5C:
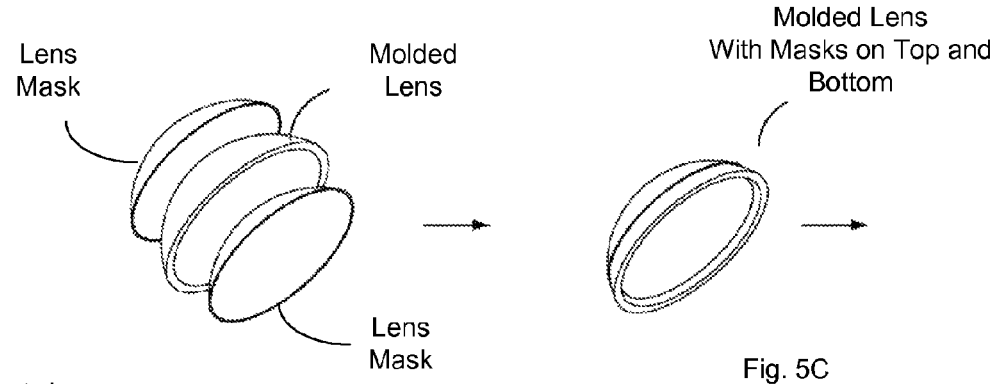
Figure 5D:
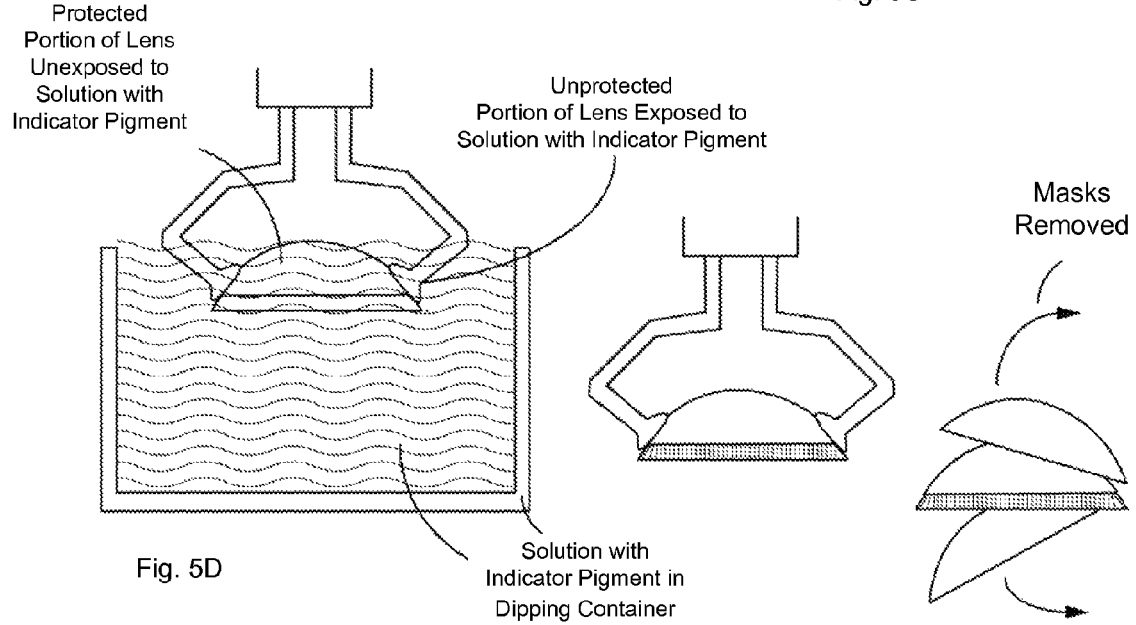

Turning now to FIGS. 5A through 5D, there are shown illustrations of an exemplary contact lens production method according to some embodiments of the present invention where a contact lens is fabricated using a molding process and later impregnated with an EOI. A contact lens is formed using an molding process (FIGS. 5A & 5B), and later masked either on one or both sides (FIG. 5C). The masked lens is then exposed to a solution of EOI and then unmasked (FIG. 5D).

Turning now to FIGS. 6A through 6C, there are shown illustrations of an exemplary contact lens production method according to some embodiments of the present invention where a contact lens is fabricated using a molding process which embeds the EOI during curing. Clear contact lens forming material is injected into a mold from the top while EOI infused contact lens material is injected from the bottom, resulting in a lens with pigment embedded in the rim or periphery.

Figure 7A:
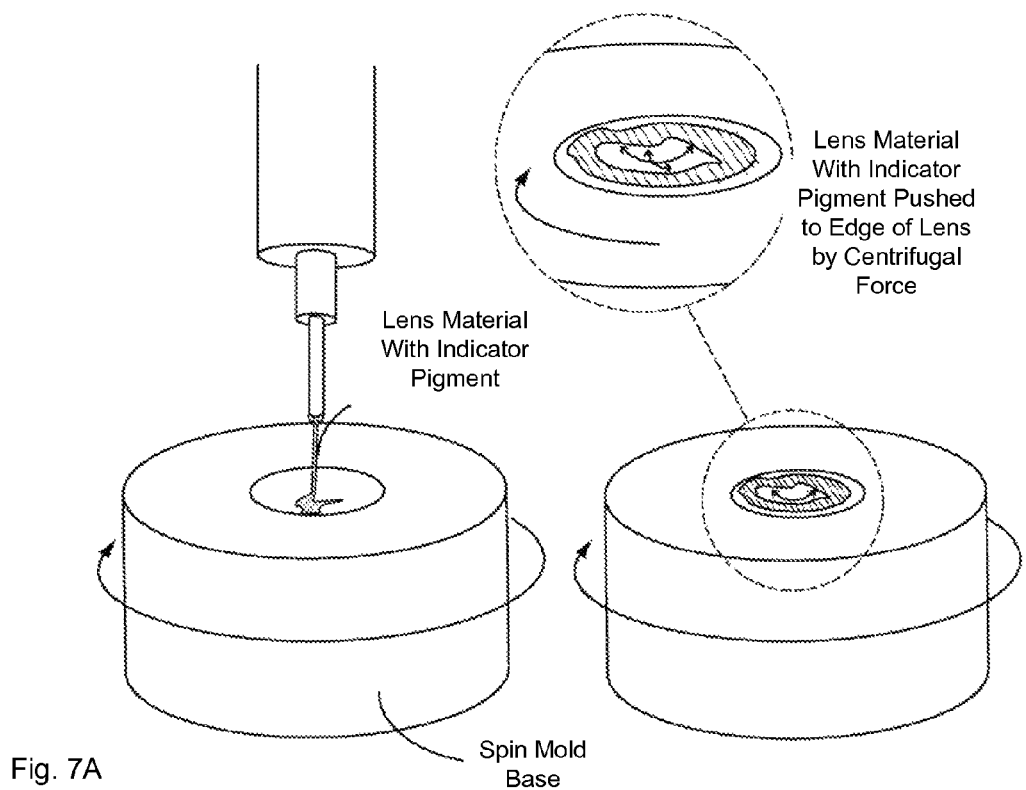
FIGS. 7A and 7B are illustrations of an exemplary contact lens production method according to some embodiments of the present invention where a contact lens is fabricated using a spin molding process which embeds the EOI during curing.
Figure 7B:
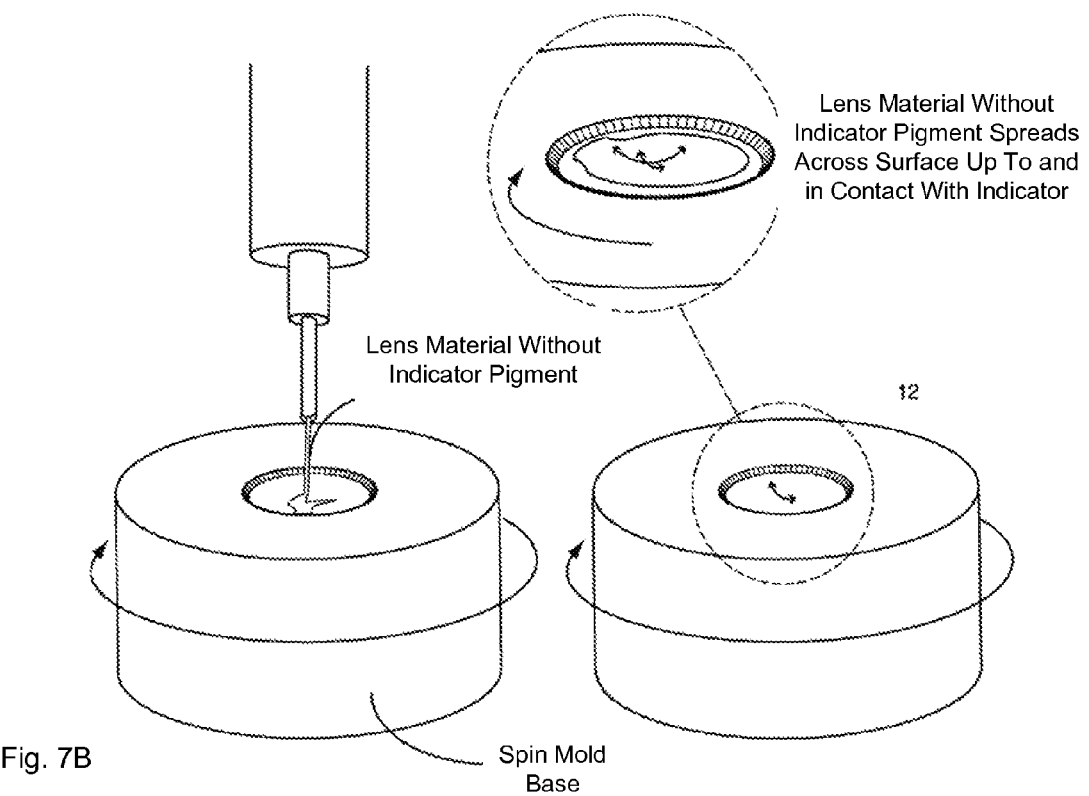

Turning now to FIGS. 7A and 7B, there are shown illustrations of an exemplary contact lens production method according to some embodiments of the present invention where a contact lens is fabricated using a spin molding process which embeds the EOI during curing. EOI infused contact lens material is introduced to a spinning mold (FIG. 7A) and later clear contact lens material is introduced to the spinning mold (FIG. 7B).

Turning now to FIGS. 8A through 8F, there are shown illustrations of an exemplary composite contact lens production method according to some embodiments of the present invention where a composite contact lens (EOI shell with Clean Polymer Core) button is fabricated using a duel pouring process and the button is later lathed into a contact lens. EOI infused contact lens material is at least partially cured such that it forms a hollow pipe/tube (FIGS. 8A & 8B). Clear contact lens material is then poured into the tube/pipe (FIG. 8C) and cured (FIG. 8D). The resulting composite rod is cut into buttons (FIG. 8E) and then lathed into contact lenses (FIG. 8F).

Turning now to FIGS. 9A through 9D, there are shown illustrations of an exemplary contact lens production method according to some embodiments of the present invention where a channel or cavity is either fabricated with or added to a contact lens and the channel/cavity is filled with the EOI, preferably as part of an EOI infused mixture with another bio-inert polymer or binder.

Figure 11A:
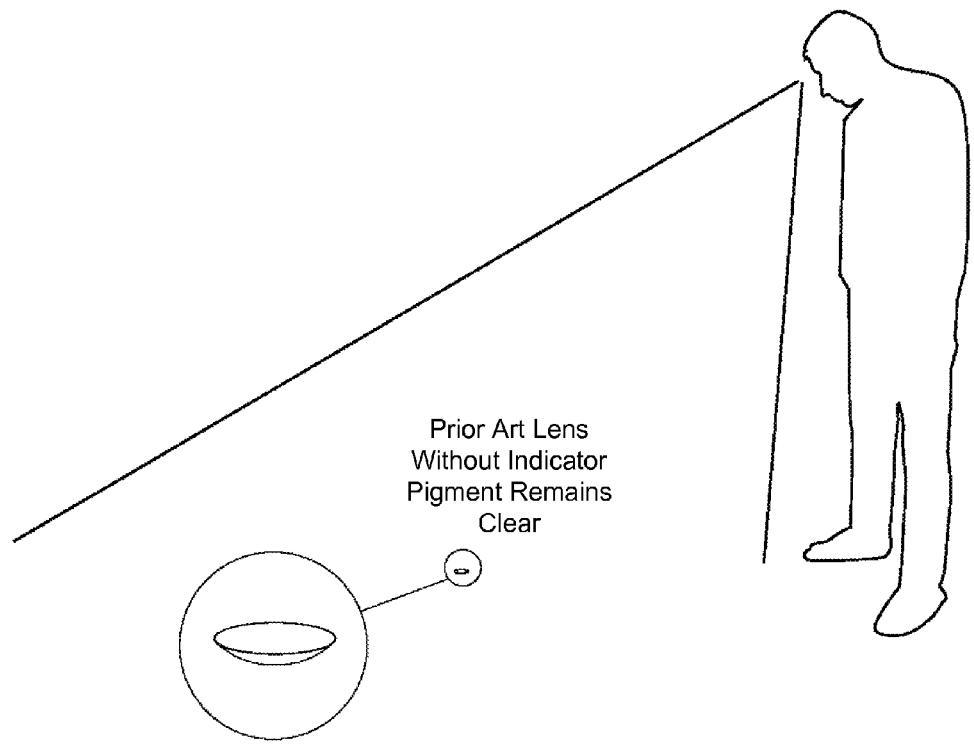
FIG. 11A is an illustration of a person looking for a contact lens according to the prior art where the contact lens remains clear when on the floor.
Figure 11B:
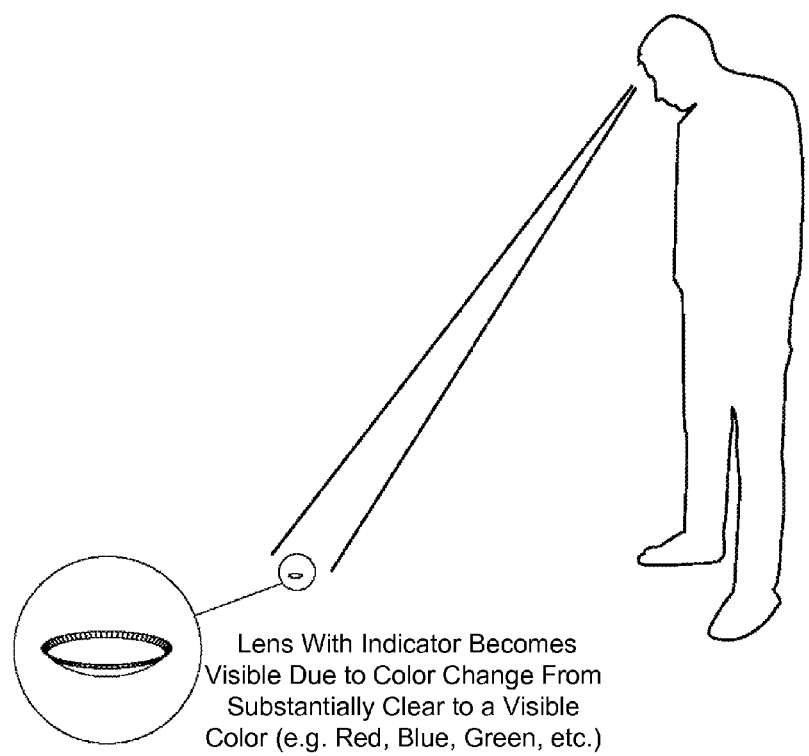
FIG. 11B is an illustration of a person looking for and locating a contact lens according to embodiments of the present invention because the EOI in the lens becomes colored/visible shortly after ejection from the eye.

FIG. 10 is an illustration of a contact lens pair within a storage container according to embodiments of the present invention where each contact lens has an EOI of a different color. FIG. 11A is an illustration of a person looking for a contact lens according to the prior art where the contact lens remains clear when on the floor. FIG. 11B is an illustration of a person looking for and locating a contact lens according to embodiments of the present invention because the EOI in the lens becomes colored/visible shortly after ejection from the eye.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A contact lens comprising:
   a substantially transparent contact lens material; and
   an extra-ocular indicator ("EOI") embedded or in contact with at least a portion of said contact lens material, wherein said EOI is at least partially composed of a pH responsive pigment and alters in color upon removal of said contact lens from an eye.

2. The contact lens according to claim 1, wherein the EOI is adapted to become relatively more visible when said contact lens is outside an eye than when said contact lens is placed in an eye.

3. The contact lens according to claim 2, wherein said EOI is at least partially composed of a pigment adapted to alter in color upon coming in contact with organic matter.

4. The contact lens according to claim 1, wherein the EOI is adapted to become relatively less visible when said contact lens is placed in an eye than when said contact lens is outside an eye.

5. The contact lens according to claim 4, wherein said EOI is at least partially composed of a pigment adapted to alter in color upon coming in contact with organic matter.

6. The contact lens according to claim 1, wherein said EOI is at least partially composed of a pigment adapted to alter in color upon coming in contact with organic matter.

7. The contact lens according to claim 1, wherein said contact lens is at least partially composed of a material selected from the group consisting of materials identified in the market as: (1) Alphafilcon A, (2) Asmofilcon A, (3) Balafilcon A, (4) Comfilcon A, (5) Enfilcon A, (6) Galyfilcon A, (7) Hilafilcon A, (8) Hilafilcon B, (9) Hioxifilcon, (10) Lotrafilcon B, (11) Methafilcon A, (12) Omafilcon A, (13) Phemfilcon A, (14) Polymacon, (15) Senofilcon, (16) Tetrafilcon A, (17) Vifilcon A, (18) polymethyl methacrylate, (19) hydrophilic gel, (20) silicon, (21) HEMA, (22) GMA, (23) MMA, (24) NVP, (25) xerogel and (26) rigid gas permeable polymer.

8. The contact lens according to claim 1, wherein the indicator includes a material selected from the group: (1) leuco dye, (2) lactone, (3) weak acid, (4) dodecanol, (5) spirolactones, (6) fluorans, (7) spiropyrans, (8) fulgides, (9) bisphenol A, (10) parabens, (11) 1,2,3-triazole derivates, and (12) 4-hydroxycoumarin.

9. Contact lenses comprising:
a first contact lens with a first extra-ocular indicator ("EOI") adapted to alter to a first color upon removal of said first lens from an eye, and a second contact lens with a second extra-ocular indicator ("EOI") adapted to alter to a second color upon removal of said second lens from an eye, wherein the first and second EOI's are each at least partially composed of a pH responsive pigment.

10. The contact lenses according to claim 9, wherein said first and second EOI's are adapted to become relatively more visible when their respective contact lens is outside an eye than when said contact lens is placed in an eye.

11. The contact lenses according to claim 10, wherein said first and second EOI's are at least partially composed of a pigment adapted to alter in color upon coming in contact with organic matter.

12. The contact lenses according to claim 10, wherein said first and second EOI's are adapted to become relatively less visible when their respective contact lens is placed in an eye than when outside an eye.

13. The contact lenses according to claim 12, wherein said first and second EOI's are at least partially composed of a pigment adapted to alter in color upon coming in contact with organic matter.

14. The contact lenses according to claim 9, wherein said contact lenses are at least partially composed of a material selected from the group consisting of materials identified in the market as: (1) Alphafilcon A, (2) Asmofilcon A, (3) Balafilcon A, (4) Comfilcon A, (5) Enfilcon A, (6) Galyfilcon A, (7) Hilafilcon A, (8) Hilafilcon B, (9) Hioxifilcon, (10) Lotrafilcon B, (11) Methafilcon A, (12) Omafilcon A, (13) Phemfilcon A, (14) Polymacon, (15) Senofilcon, (16) Tetrafilcon A, (17) Vifilcon A, (18) polymethyl methacrylate, (19) hydrophilic gel, (20) silicon, (21) HEMA, (22) GMA, (23) MMA, (24) NVP, (25) xerogel and (26) rigid gas permeable polymer.

15. The contact lenses according to claim 9, wherein said first and second EOI's include a material selected from the group: (1) leuco dye, (2) lactone, (3) weak acid, (4) dodecanol, (5) spirolactones, (6) fluorans, (7) spiropyrans, (8) fulgides, (9) bisphenol A, (10) parabens, (11) 1,2,3-triazole derivates, and (12) 4-hydroxycoumarin.

* * * * *